United States Patent [19]

Rabedeau

[11] 3,947,816

[45] Mar. 30, 1976

[54] OMNIDIRECTIONAL OPTICAL SCANNING APPARATUS

[75] Inventor: Melbourne Edward Rabedeau, Saratoga, Calif.

[73] Assignee: International Business Machines Corporation, Armonk, N.Y.

[22] Filed: July 1, 1974

[21] Appl. No.: 484,479

[52] U.S. Cl. .... 340/146.3 Z; 235/61.11 E; 250/568; 340/146.3 F; 350/7; 350/285
[51] Int. Cl.² ............................................. G06K 7/14
[58] Field of Search 340/146.3 Z, 146.3 H, 146.3 F; 235/61.11 E; 178/7.6; 350/6, 7, 103, 99, 285; 250/568

[56] References Cited
UNITED STATES PATENTS

| | | | |
|---|---|---|---|
| 3,619,028 | 11/1971 | Keene et al. | 350/285 |
| 3,632,871 | 1/1972 | Watkins et al. | 350/7 |
| 3,728,677 | 4/1973 | Munson | 340/146.3 Z |
| 3,762,791 | 10/1973 | Fournier et al. | 350/6 |
| 3,818,444 | 6/1974 | Connell | 340/146.3 Z |
| 3,902,048 | 8/1975 | Fleischer et al. | 340/146.3 Z |

OTHER PUBLICATIONS
U.S. Published Patent Application–B382,783, Bowen et al., "Omnidirectional Optical Scanner", 1-28-75.

*Primary Examiner*—Leo H. Boudreau
*Attorney, Agent, or Firm*—George E. Roush

[57] ABSTRACT

An omnidirectional optical system is arranged for scanning bar coded labels passing a rectangular scanning window with a plurality of interlaced scans in a plurality of differing directions whereby the labels are completely scanned irrespective of orientation. The interlaced and plural directive scanning rays are generated by directing a beam of light, from a laser or like light source, onto a rotating multi-faceted mirror for deflecting the light beam in a line extending in a given direction. A set of fixed mirrors is positioned to deflect the light beam in a number of laterally displaced scanning segments all parallel to the line extending in the given direction. A pair of fixed end mirrors are arranged for reflecting the light from half of the segments back onto the other half of the segments to provide the intersecting scanning pattern. Beam splitting mirrors are interposed in the light beam from the laser for providing additional light beams directed onto the rotating mirror to provide an interlaced raster.

14 Claims, 12 Drawing Figures

OMNIDIRECTIONAL OPTICAL SCANNING APPARATUS

The invention disclosed herein parallels that merchandizing optical omnidirectional scanning system disclosed in the copending U.S. Patent application Ser. No. 382,783 of Arlen J. Bowen et al filed on the 26th day of July 1973 for "An Omnidirectional Optical Scanner" and thereafter issued on the 11th day of November 1975 as U.S. Pat. No. 3,919,527.

The invention relates to optical scanning systems and more particularly to omnidirectional optical scanning systems.

The invention finds particular application for scanning randomly oriented bar coded labels, which for example, are attached to consumer items being checked out at a counter. The check out clerk, or checker, merely passes the item across the scan window insuring that the label is within the scanning window as the item is being placed into a box or bag. Except for some relatively small items, little attention need be paid to the orientation of the items as they are moved across the scanning window.

Omnidirectional scanning systems have been suggested as particularly suitable for scanning systems where the checker passes the items across a scanning window. The prior art also discloses optical systems and components which those skilled in the art will consider in the design and development of a point-of-sale item scanning system.

The more pertinent arrangements in the prior art are to be found in the following U.S. Pat. Nos.

| | | | |
|---|---|---|---|
| 3,414,731 | 12/1968 | Sperry | 250/219 |
| 3,456,997 | 7/1969 | Stites et al | 350/7 |
| 3,553,437 | 1/1971 | Boothroyd | 235/61.11 |
| 3,600,556 | 8/1971 | Acker | 235/61.11 |
| 3,684,867 | 8/1972 | Acker | 235/61.11 |
| 3,701,098 | 10/1972 | Acker | 340/146.3 |
| 3,718,761 | 2/1973 | Meyer | 178/7.6 |
| 3,728,677 | 4/1973 | Munson | 340/146.3P |

The patents to Sperry and U.S. Pat. No. 3,600,556 to Acker are directed to circular labels which are readable without orientation; the arrangements shown are for the centering of the label before the scanning is begun. The U.S. Pat. No. 3,701,098 to Acker is directed to an arrangement for orienting the item by rotation of optical system components to coincide with each other after which scanning is begun. The patents to Stites, Boothroyd and the U.S. Pat. No. 3,684,867 to Acker are directed to arrangements for accommodating skew, which is a relatively slight misalignment in orientation, and the arrangements are not readily applicable to the solution of the problem with which the invention is concerned.

The patents to Meyer and Munson are more pertinent but they are directed to systems limited to a square scanning window rather than a narrow rectangular scanning window of the invention. The square scanning window for a given width requires a greater reach on the part of the checker and is not as desirable from a human factors point of view as is a narrow rectangular scanning window. The narrow rectangular scanning window; however, does require multiple trace scanning patterns for insuring that the coded label will be properly scanned. The multiple trace scanning patterns are produced according to the invention by deflected light beam patterns, which have a subtle safety advantage in that the average laser power entering a fixed aperture (laser power times aperture diameter divided by length of scan) is less. The desired light patterns according to the invention are generated by relatively simple and inexpensive optical apparatus.

The objects of the invention indirectly expressed hereinbefore and those that will appear as the specification progresses are attained in an optomechanical system having an intense, substantially non-divergent light source, such as a laser, and fixed and rotating mirrors that deflect the beam from that source to a narrow rectangular scanning window. The rotating mirror is arranged with respect to fixed beam-forming mirrors so that the beams trace out an overlapping and crossing pattern. Beam splitting apparatus is interposed to provide an interlaced pattern.

In order that all the advantageous aspects of the invention obtain in practice, a specific embodiment, given by way of example only, is described in the remainder of this text with reference to the accompanying drawing, also forming a part of the specification, and in which.

Figure 1:
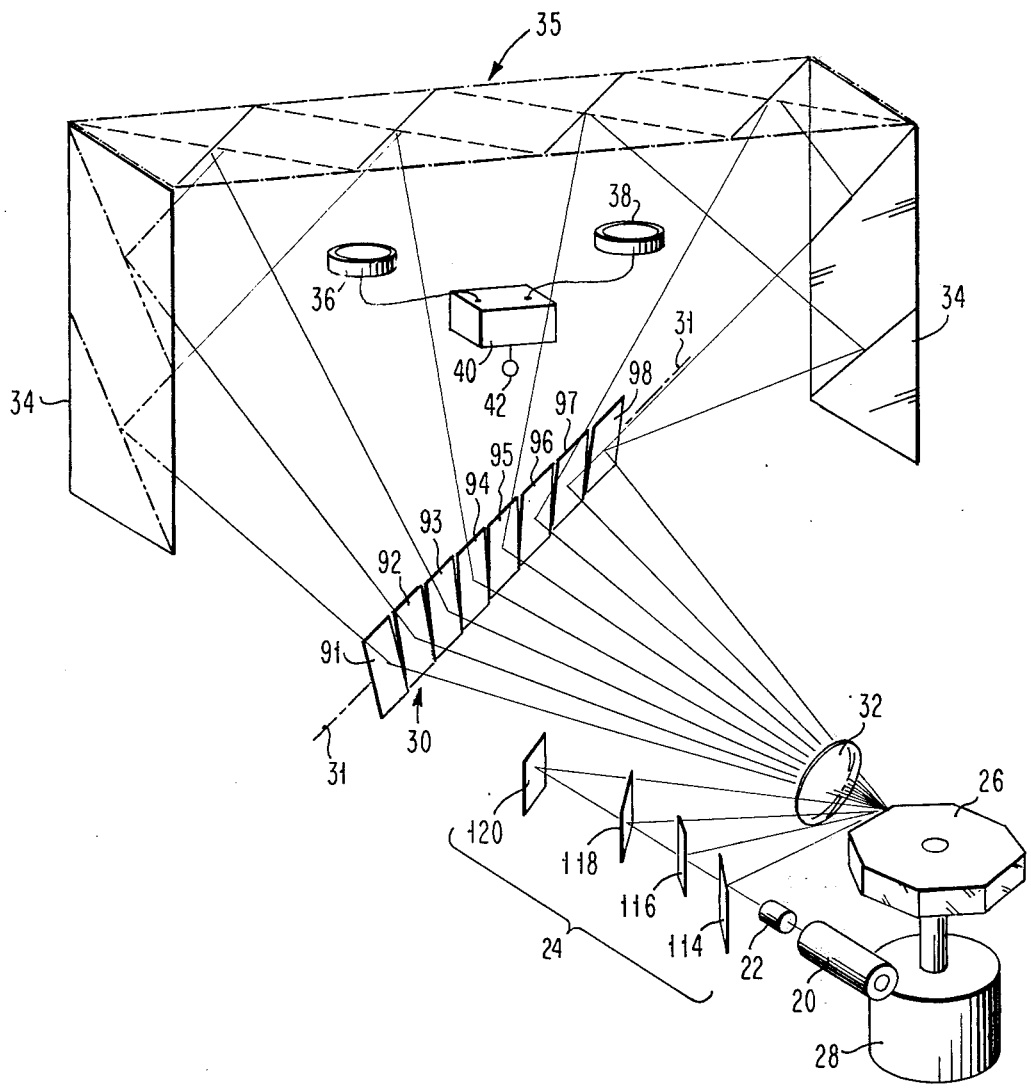
FIG. 1 is a schematic diagram of omnidirectional optical scanning apparatus according to the invention.

A schematic overall view of an optical scanning system according to the invention is given in FIG. 1. A laser 20 is employed as a light source for generating an intense narrow beam of light. This beam of light is directed through optical apparatus 22 which includes lenses for expanding the laser beam onto a beam splitting arrangement 24 which in turn directs a multiple of beams onto a multifaceted rotating mirror 26 driven by an electric motor 28. The beam splitting arrangement 24 is provided for effecting an interlaced pattern where desired and otherwise may be omitted. Each beam swept out by the rotating mirror 26 is divided into a multiple of beam scanning segments, each parallel to the other scan segments by a fixed mirror assembly 30 composed of a multiplicity of mirrors disposed in slightly different angular orientations about a common imaginary straight line 31 in the plane of each mirror in response to the infringing "fan" of light translated by a lens 32. The line 31 is parallel to the plane of the window 35 and each mirror is arranged at an angle of approximately 45° to the longitudinal axis of the window 35. A pair of end mirrors 34 are arranged to reflect some of the beam scan segments so that there will be scan segments at right angles to the first (non-reflected) scan segments. Thus, a series of X-shaped or crossed scans will be produced in the aperture of a scanning window 35. Photoelectric devices 36 and 38 are arranged below the scanning window 35 and in such positions that light from the scanning beams as reflected by the label will impinge upon the photosensitive devices 36 and 38 which are connected to video signal processing circuitry 40 for analyzing the electric signal to identify the information presented at the scanning window 35. An output electric signal is delivered at output terminal 42 for application to the utilization circuitry.

Figure 2:
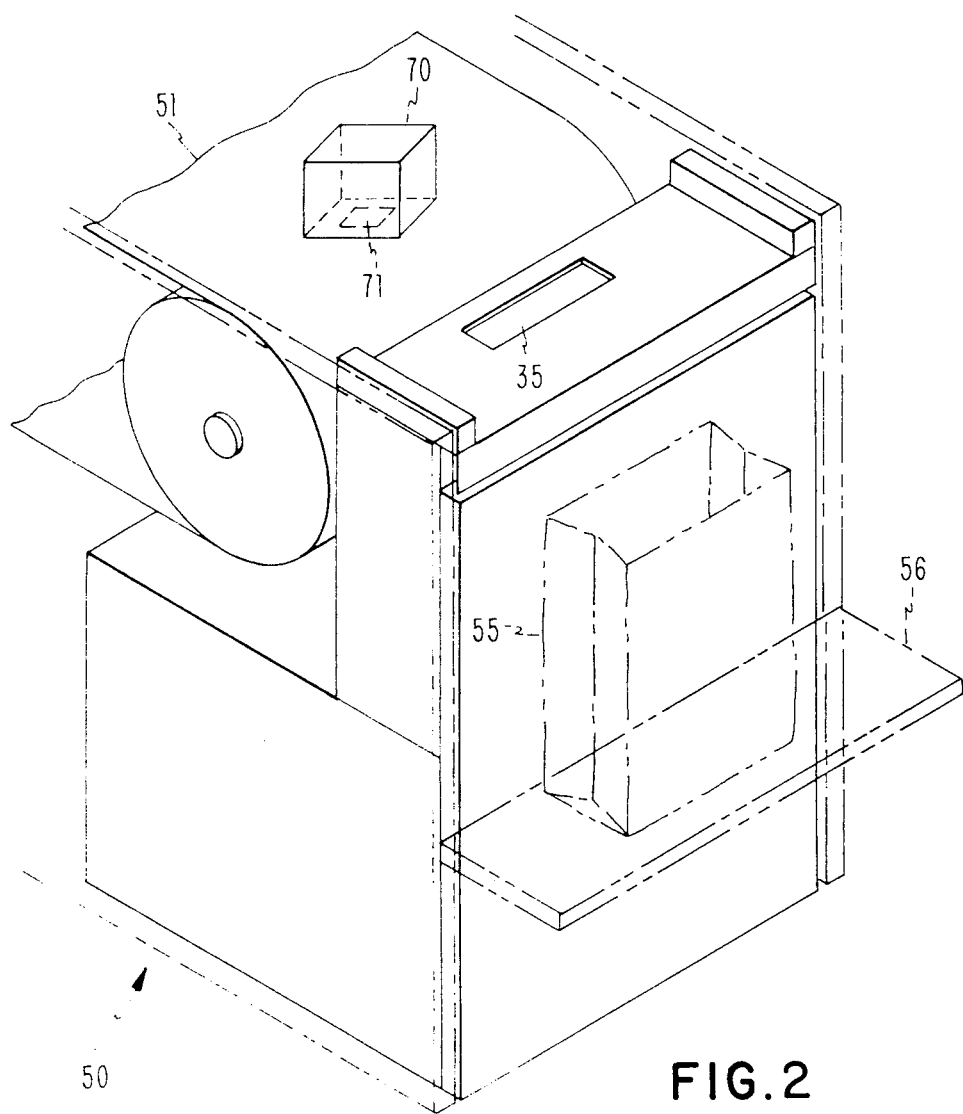
FIG. 2 is a perspective view illustrating a setting for the omnidirectional scanning apparatus of the invention.

A setting for the invention is shown in FIG. 2. The scanning window 35 is located at the top of an enclosure 50 forming a market checkout stand housing the previously described components. The scanning window 35 is a narrow rectangular aperture ideally about 2.5 by 25 centimeters, formed in the housing 50 and covered by glass or other suitable material transparent to the light generated by the laser 20.

An item of merchandise 70 bearing a bar coded label 71 is transported by a conveyor belt 15 to the scanning area. The checkout clerk passes the item 70 with the label 71 face down over the scanning window 35 just prior to placing the item 70 into a paper bag 55 which is supported on a shelf 56.

Figure 3:
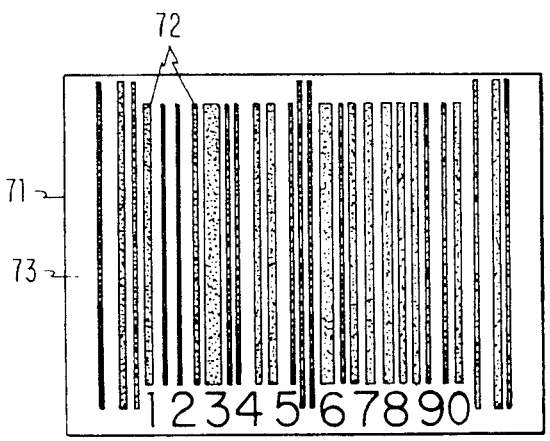
FIG. 3 depicts a typical label for which the omnidirectional scanning apparatus of the invention is arranged.

The label 71 is a bar coded label of the type shown in FIG. 3. The label 71 is printed with a plurality of bars 72 which have a reflectance less than the background area 73. Thus, as the light beam scans across the label 71, it is modulated by the difference in reflectance between the background 73 and the printed ink bar 72. The modulated reflected light is collected by the photosensitive devices 36 and 38 (FIG. 1) which deliver an electric signal to the video signal processing circuitry 40 where it is analyzed to identify the information represented by the bars 72 on the label 71. The scanning pattern at the window 35 is arranged to interpret the bars of the label 71 so that the data will be recovered irrespective of the orientation of the label 71 to the scanning window 35.

In order to make the operation of the optomechanical scanning system according to the invention clear and to enable those skilled in the art to practice the invention, the system will be described hereinafter in a step-by-step progression.

Figure 4:
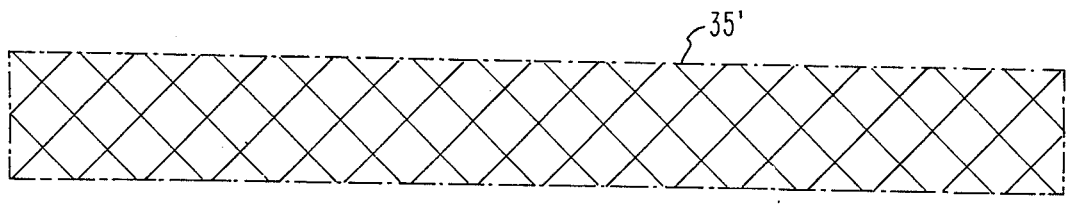
FIG. 4 is a diagram illustrating one complete scanning pattern.
Figure 5:
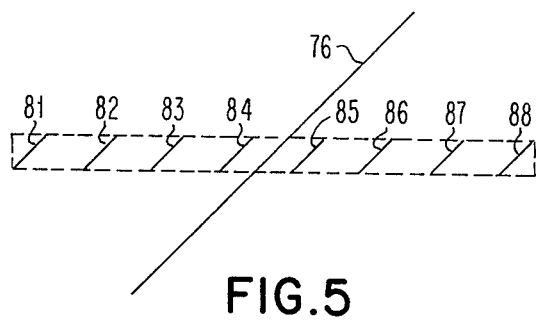
FIG. 5 is a schematic diagram illustrating the layout of light scanning segments for omnidirectional scanning.
Figure 7:
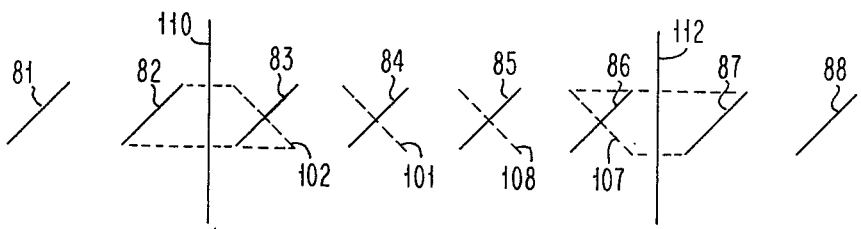
FIG. 7 is another diagram showing scan segments reflected for producing crossed scanning segments.
Figure 6A:
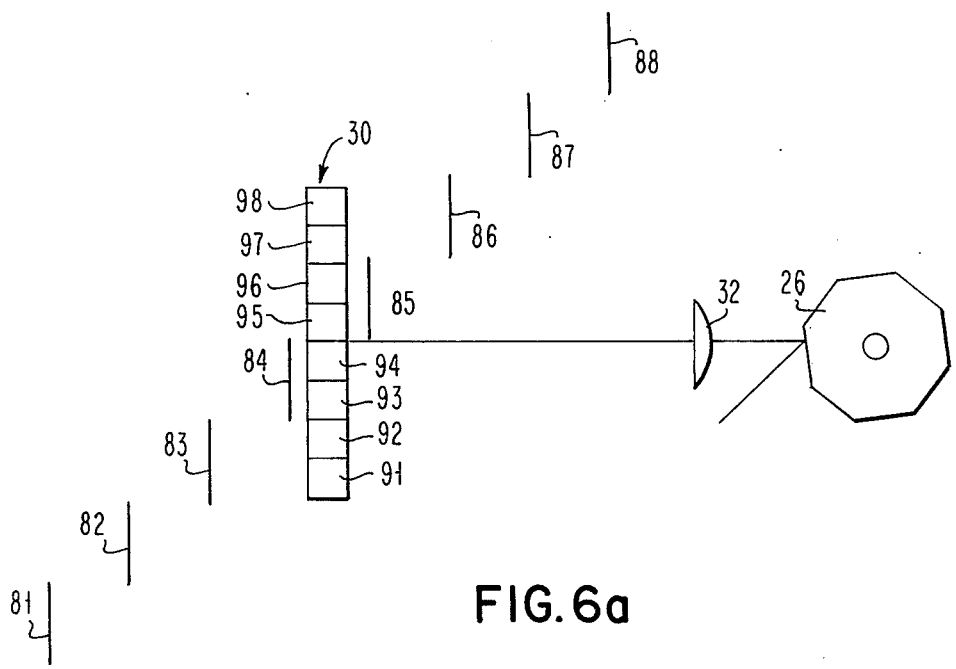
FIGS. 6a and 6b are plan and evaluation views of optical scanning segment dividing apparatus according to the invention.
Figure 6B:
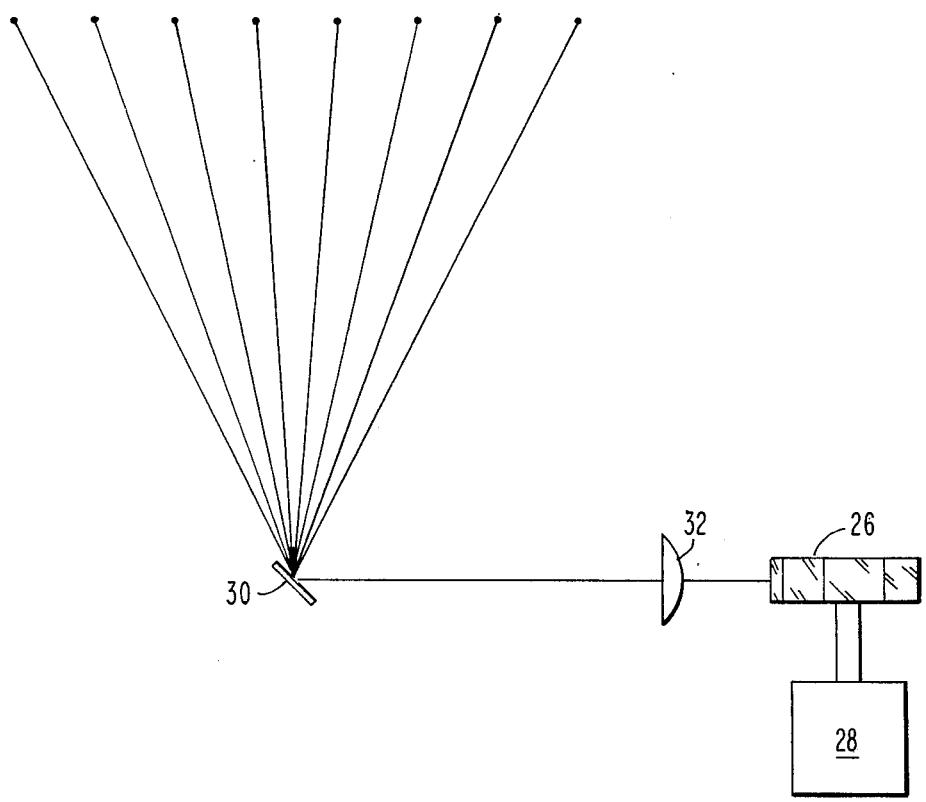

A schematic diagram of the desired scanning pattern to appear in the window 35 is shown in FIG. 4. In this embodiment, the window 35 was 2.8 by 25.4 centimeters. The scanning lines were developed as follows. One beam from the laser 20 is deflected by the rotating mirror 26 through the lens 32 that focuses the beam in the scan area. Referring to FIG. 5, a line 76 produced by the rotating mirror 26 is divided into eight segments 81 . . . 88 laterally displaced with respect to the line 76, as shown in FIGS. 6a and 6b by an assembly 30 of fixed mirrors 91 . . . 98 that fold the fan of light produced by the rotating mirror 26. Each mirror 91 . . . 98 is set at its own unique angle in order to reflect light from the laser 20 as directed by the rotating mirror 26 through the lens 32 to its respective line segment in order to produce scanning line segments. A pair of end mirrors 110 and 112 are placed to reflect four of the eight segments back onto the other four as shown in FIG. 7. The mirror images 102, 101, 108, 107 of line segments 81, 82, 87, 88 then form scan segments intersecting scan segments 83, 84, 85 and 86 to form four X's. The end mirrors must be long in the direction normal to the plane of the drawing in order to intercept the beams directed to what, in the absence of the end mirrors 110 and 112, would be the outer two scan segments 81, 82, and 87, 88 at each end.

Figure 8:
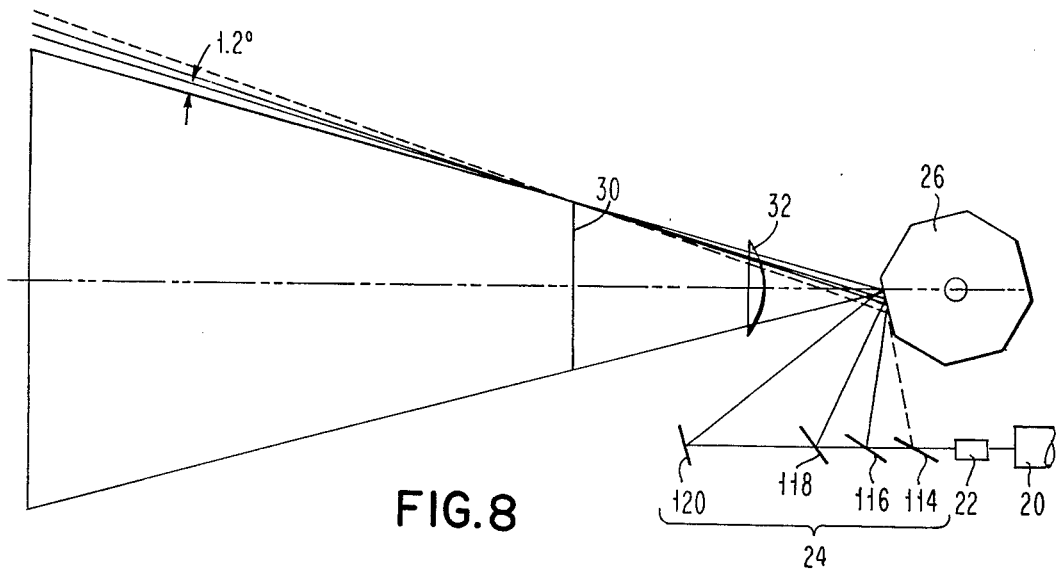
FIG. 8 is a diagram illustrating optical scanning beam splitting apparatus for producing an interlaced scan according to the invention.

Thus far four crossed scanning line segments have been produced. Three additional sets of cross line scanning segments are interlaced between each of the existing pairs of cross scanning line segments 83, 102; 84, 101; 85, 108 and 86, 107. Three additional scanning beams from the laser 20 are generated by the arrangement shown in FIG. 8. Three beam splitting mirrors 114, 116, and 118 are interposed between the laser 20 and a " reflecting mirror 120 all of which mirrors are arranged to direct the component beams produced thereby onto the rotating mirror 26. Each of the four beams is incident upon the rotating mirror 26 at a different angle such that only one of the beams, when reflected by the rotating mirror 26 is operable in the field of view of the remainder of the optical system for a given angular position of mirror 26. Thus, one beam is scaanning while the other three are 37 flying back". Thus, the angular field of view of mirror assembly 30 as seen in the space between lens 32 and mirror 26 should be less than, or just equal to 720/(nxm), where $n$ is the number of facets on mirror 26 and $m$ is the total number of beams generated by the beam splitter assembly 24. From the diagram, it is apparent that each of the beams reflected from a given segment of the segmented mirror assembly 30 will produce an image somewhat displaced from that produced by the other beams. If the direction of the beams out of the plane of diagram is different, there will also be an image displacement in the direction normal to the plane of the drawing. Hence, the interlaced cross scan line segments can be positioned relative to each other as desired, by adjusting the position (relative to each other) at which the beams are reflected from the rotating mirror 26. This is done in the proper orientation of laser 20 and the beam splitting mirrors 114, 116, and 118 and the reflecting mirror 120 that give rise to the four separate scanning beams.

Since the optical path length from the segmented mirror assembly 30 to the image surface at the scanning window is greater for the outer segments 81 and 88, it may be desirable to use slightly convex mirrors for the segments near the end of the array in order to increase the focal length of the system slightly for these segments.

With a a line of segmented mirrors 81 . . . 88 set at different angles to produce the displaced scanning line segments as described above, the exact relative position of the scanning line segment will be somewhat the function of the longitudinal position of the scanning window 35. If a slight change in relative positions of the scanning line segments produced by moving the observing screen longitudinally is objectionable, the assembly 30 of segmented mirrors 91 . . . 98 are replaced by a series of mirrors that each reflect the scanning beam 90° and where the mirrors are staggered in order to produce the scanning line segments. This arrangement will greatly reduce, but will not eliminate, the change in relative scanning line segments positions as the window is moved.

Figure 9:
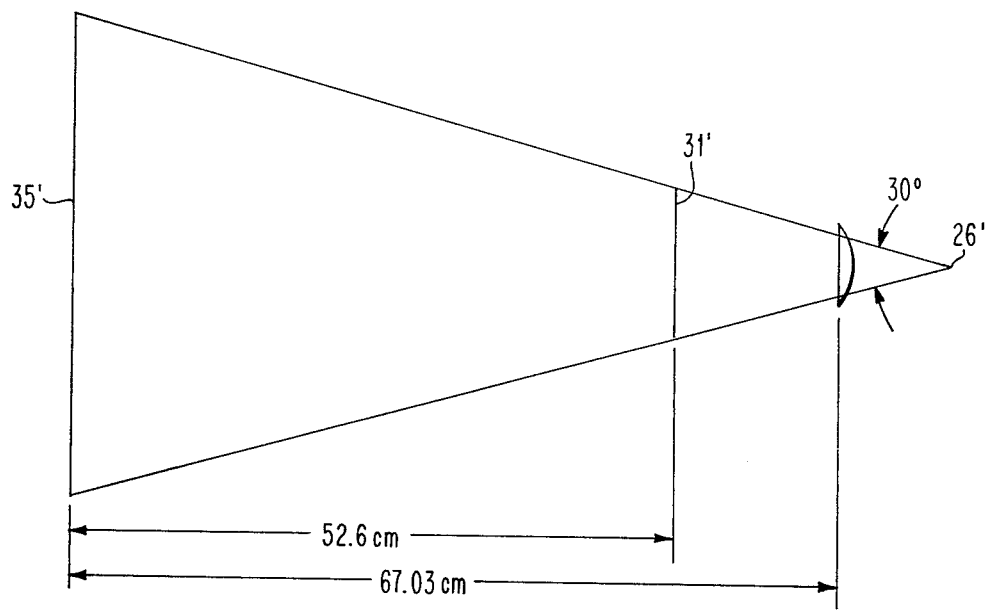
FIG. 9 is a diagram of a mirror arrangement according to the invention.

FIG. 9 is a geometric diagram of the system as described useful to those skilled in the art in designing the optical system described.

Figure 10:
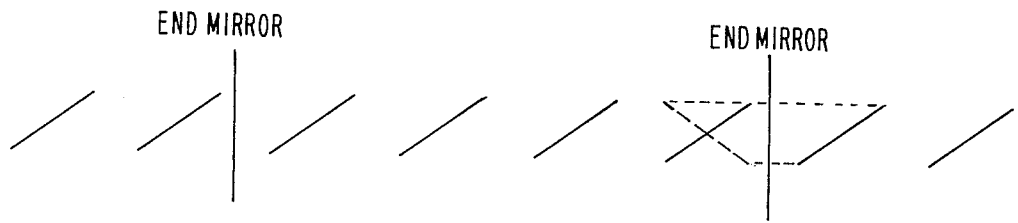
FIG. 10 is a schematic diagram illustrating an alternate displacement of scan segments according to the invention.

The number of scanning beams necessary in the system as described can be reduced to three with a significantly greater overlap in the scanning line segments by reducing the off-set or lateral displacement of the scanning line segments as shown in the diagram of FIG. 10. The amount of interlace is less than that described before because the scanning lines form angles of 35° with the side of the scanning window 35 rather than the angle of 45° shown before. With the lower angle, the scanning lines overlap more and thus less interlace is necessary.

Figure 11:
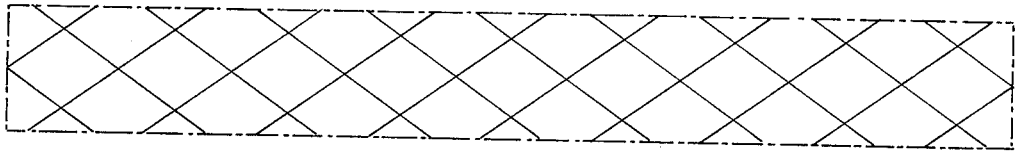
FIG. 11 is a diagram illustrating another complete scanning pattern.

FIG. 11 shows a scanning window 35 approximately 22 × 2.4 centimeters having such 35° scanning line segments.

While the invention has been shown and described particularly to reference to a preferred embodiment thereof, and alternatives have been described, it should be understood that those skilled in the art will make further changes without departing from the spirit and scope of the invention as defined in the apended claims.

The invention claimed is:

1. Omnidirectional optical scanning apparatus for scanning bar coded labels, comprising
    an elongated scanning window at which said labels are presented in random orientation,
    optical means for generating a beam of light,
    optical means arranged with respect to said generating means for deflecting said beam of light along a line in a given plane intersecting the plane of said scanning window at a predetermined angle to the longitundinal axis of said window,
    optical means interposed between said deflecting means and said scanning window for dividing said deflected beam of light along said line into scanning segments and offsetting said segments with respect to each other intersecting the plane of said scanning window at the same predetermined angle for producing a multiple of scans across said scanning window, and
    optical means intercepting a portion of said deflected light beam scanning segments and reflecting the intercepted scanning segments over to and intersecting the other scanning segments within said scanning window.

2. Omnidirectional optical scanning apparatus as defined in claim 1 and incorporating
    optical means interposed between said light beam generating means and said optical deflecting means for splitting said beam into a plurality of like beams arranged at different angles for producing a multiple of interlaced scans across said scanning window.

3. Omnidirectional optical scanning apparatus as defined in claim 1 and wherein
    said predetermined angle is one at which said scanning segments overlap one another within said scanning window.

4. Omnidirectional optical scanning apparatus for scanning bar coded labels comprising
    an elongated scanning window at which said labels are presented in random orientation,
    a light source providing a beam of light,
    a multifaceted mirror arranged for continuous rotation,
    said light source and said rotating mirror being arranged with respect to said scanning window in angular relationship at which said beam of light is deflected over a line lying at a predetermined angle to the longitudinal axis of said window is scanned by said beam of light, and
    a multiple of fixed mirrors arranged along said line and interposed between said multifaceted mirror and said scanning window for dividing the deflected beam of light at said line and offsetting the divisional segments thereof into segments scanning consecutively across said window at said predetermined angle.

5. Omnidirectional optical scanning apparatus as defined in claim 4 and incorporating
    an optical beam splitting mirror assembly interposed between said laser and said multifaceted mirror for producing a plurality of beams projected onto said mirror at different angles at which the scanning beams across said scanning window are interlaced.

6. Omnidirectional optical scanning apparatus as defined in claim 4 and wherein
    two of said multiple mirrors are arranged at the ends of said window and depend therefrom parallel to each other.

7. Omnidirectional optical scanning apparatus as defined in claim 6 and wherein
    the remainder of said multiple mirrors are arranged on a line at the center thereof at an angle of substantially 45° to the longitudinal axis of said scanning window, and
    each mirror is also arranged at an angle with respect to the other mirrors on said line.

8. Omnidirectional optical scanning apparatus as defined in claim 7 and wherein
    the mirrors of said remainder of multiple mirrors at the ends of said line are slightly convex for increasing the focal length.

9. Omnidirectional optical scanning apparatus as defined in claim 4 and incorporating
    a photoresponsive device arranged for intercepting light from said scanning window as reflected by said label, and
    electric signal translating circuitry coupled to said photoresponsive device for producing an electric signal indicative of the information borne by said label.

10. Omnidirectional optical scanning apparatus as defined in claim 4 and wherein
    said scanning window is an elongated rectangle having an aspect ratio of 10:1.

11. Omnidirectional optical scanning apparatus as defined in claim 10 and wherein
    sixteen crossed scans appear in said scanning window.

12. Omnidirectional optical scanning apparatus as defined in claim 10 and wherein said scanning segment intersect at angles of 90° within said scanning window.

13. Omnidirectional optical scanning apparatus as defined in claim 10 and wherein said scanning segment intersect at angles of 80° within said scanning window.

14. Omnidirectional optical scanning apparatus for scanning bar coded labels comprising
    an elongated scanning window at which said labels are presented in random orientation,
    a light source providing a beam of light, a multifaceted mirror arranged for continuous rotation, said light source and said rotating mirror being arranged with respect to said scanning window in angular relationship at which said beam of light is deflected over a line lying at a predetermined angle to the longitudinal axis of said window is scanned by said beam of light, and a multiple of fixed mirrors arranged along said line and interposed between said multifaceted mirror and said scanning window for dividing the deflected beam of light at said line and offsetting the divisional segments thereof into segments scanning consecutively across said window at a rate imparting the appearance to the eye of scanning substantially simultaneously across said window at said predetermined angle.

* * * * *